United States Patent [19]
Smith et al.

[11] 3,799,685
[45] Mar. 26, 1974

[54] FRAME CONNECTOR STRUCTURE

[76] Inventors: Edward A. Smith, 6641 W. 6th St., Los Angeles, Calif. 90048; Robert L. Day, 1518 Grismer St., Burbank, Calif. 91504

[22] Filed: July 6, 1971

[21] Appl. No.: 159,958

[52] U.S. Cl. ............... 403/298, 52/753 E, 52/585, 52/285, 403/383
[51] Int. Cl. ............................................. F16b 7/00
[58] Field of Search .......... 287/189.36 H, 189.36 C, 287/54 A, 54 B, 54 C, 20.92 E, 20.92 K, 127, 114, 118, 110; 52/285, 475, 656, 585

[56] References Cited
UNITED STATES PATENTS

| | | | |
|---|---|---|---|
| 1,817,775 | 8/1931 | Sipe | 287/54 C |
| 3,004,784 | 10/1961 | Selby | 287/189.36 H X |
| 3,353,853 | 11/1967 | Heywood | 287/54 C |
| 3,532,369 | 10/1970 | Reilly | 287/54 A |
| 3,585,770 | 6/1971 | Maizler | 287/189.36 H |

*Primary Examiner*—James R. Boler
*Assistant Examiner*—Wayne L. Shedd
*Attorney, Agent, or Firm*—Flam & Flam

[57] ABSTRACT

Apparatus for connecting a tubular frame element having a generally square or rectangular cross-section to another structural element comprising an elongated connector structure adapted to be connected to the structural element and to extend into the frame element. The connector structure includes a plurality of arms which diverge in mutually orthogonal directions to engage the inner surfaces of the frame element, preferably at the four corners thereof. Each of the arms includes or supports a compressible structure which is sufficiently flexible to facilitate the telescoping of the frame element thereover and, thereafter, to rigidly grip the frame element to form an exceedingly strong connection. According to the preferred embodiments of the invention, the compressible structure comprises a plurality of teeth positioned at the radially outer end of each of the arms to increase the gripping action of the connector structure.

14 Claims, 14 Drawing Figures

PATENTED MAR 26 1974 3,799,685
SHEET 1 OF 3
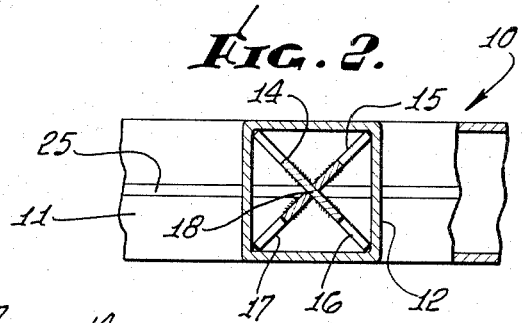
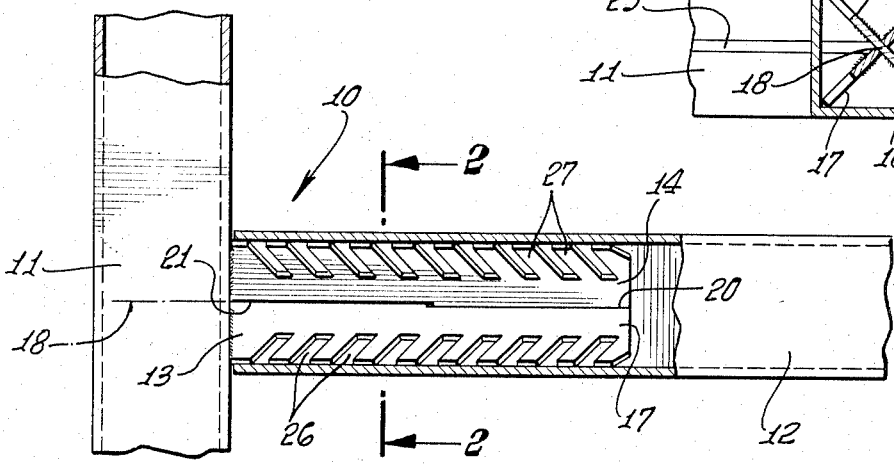
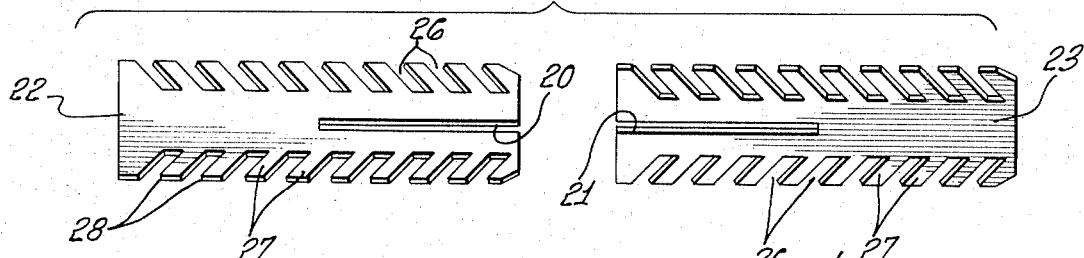
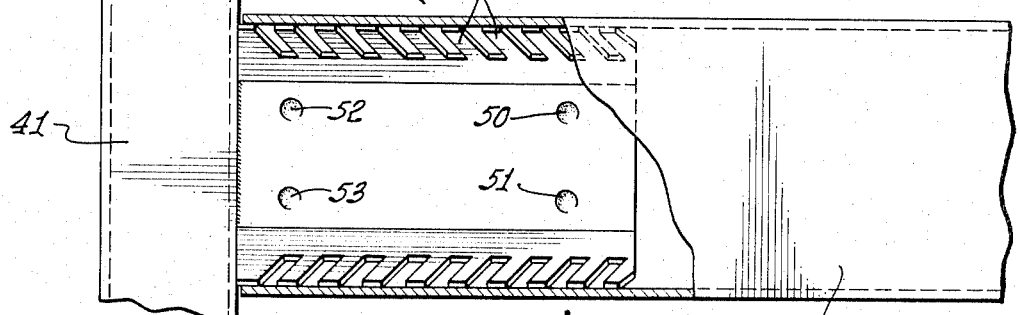
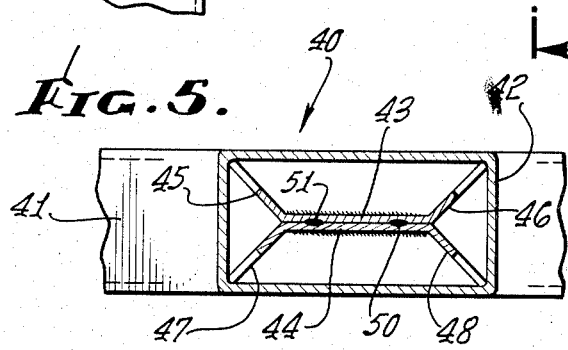
INVENTORS.
EDWARD A. SMITH
ROBERT L. DAY
BY
Flan and Flan
ATTORNEYS.

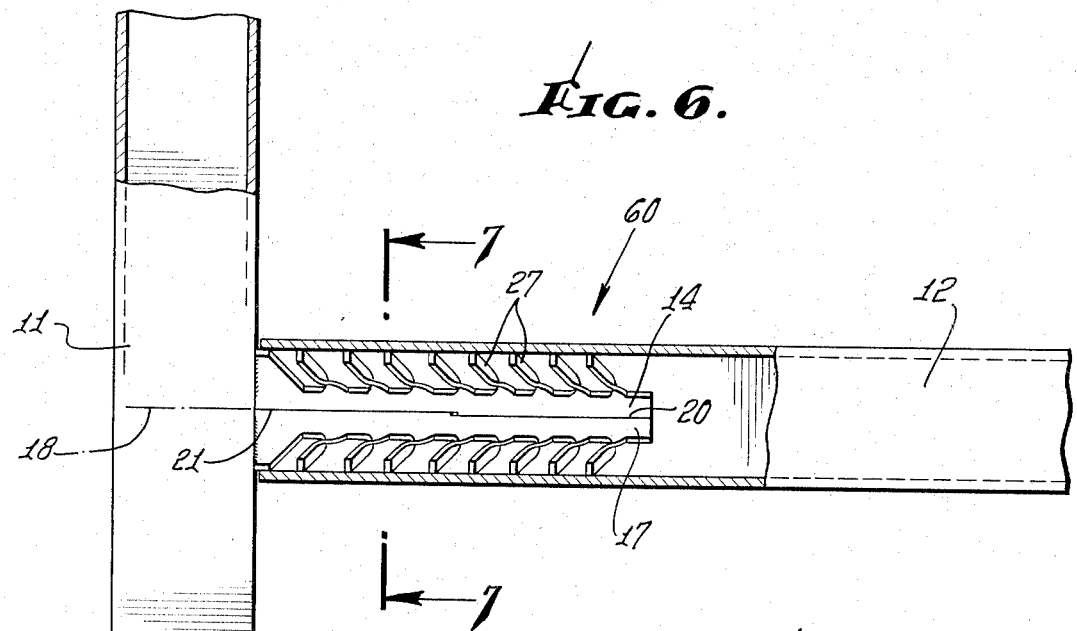
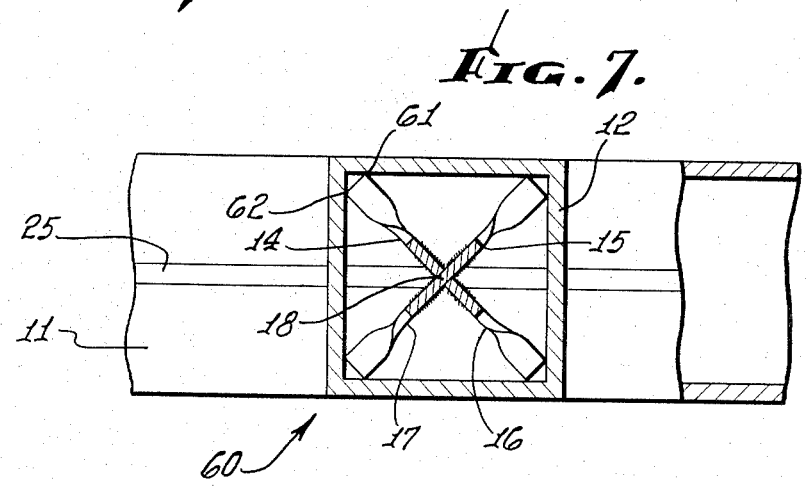
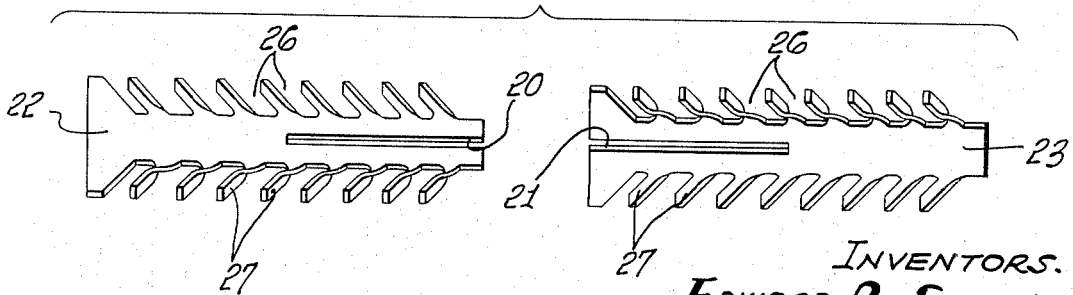

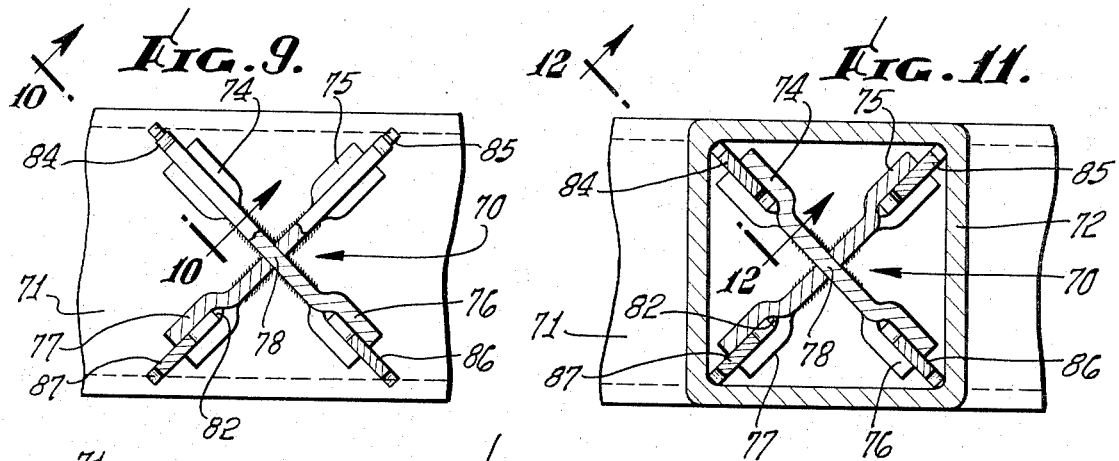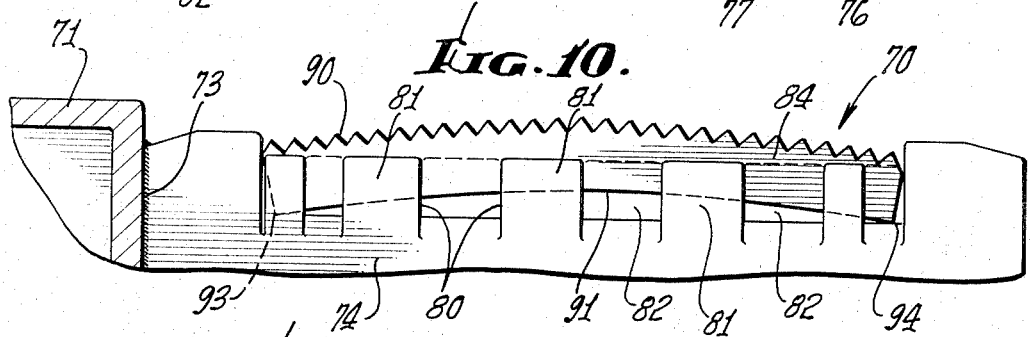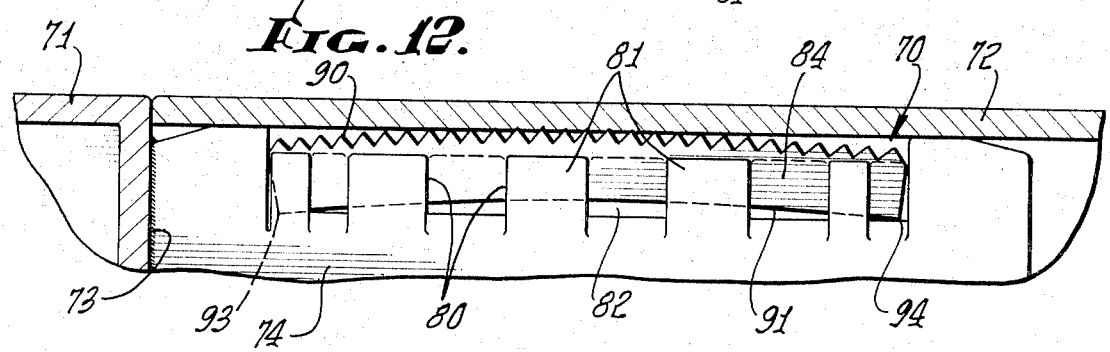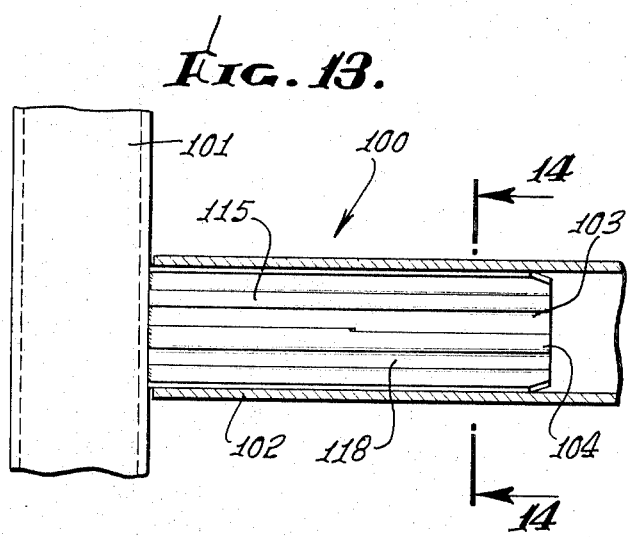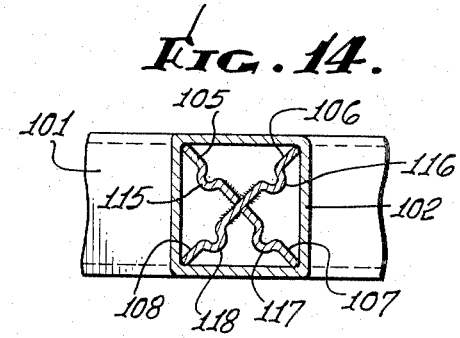
INVENTORS.
EDWARD A. SMITH
ROBERT L. DAY
BY Flam and Flam
ATTORNEYS.

FRAME CONNECTOR STRUCTURE

BACKGROUND OF THE INVENTION

1. Field of the Invention

The present invention relates to structures for connecting tubular frame elements, such as used in furniture, cabinets, store fixtures, scaffolds, racks and the like and, more particularly, to a novel frame connector structure which will provide a rigid and exceedingly strong connection without interfering with the normal shape and function of the frame elements.

2. Description of the Prior Art

Tubular frame elements which may be assembled to form many different types of structures are presently used in a wide variety of situations. In the first instance, such frame elements are used to construct racks, scaffolds, store fixtures and the like where the elements may be readily assembled at the site of use. In addition, such tubular frame elements have become increasingly popular over recent years in furniture items, such as cabinets, tables, chairs, etc.

Several requirements must be satisfied when connecting such frame elements. For example, it is usually a requirement that the connection between the frame elements be rigid and strong. This is especially so in the case of store fixtures, racks, scaffolds and the like since such structures may have to support great weights. On the other hand, it is also a requirement with items of furniture if they are to be durable and have a long life. However, because of still other requirements, it is usually not possible or practical to satisfy the strength requirement by welding the frame elements together. For example, in the case of store fixtures, racks, scaffolds and the like, it is necessary to be able to assemble the elements at the site of use and it is simply not practical to weld the elements in such a case. With respect to furniture items, it is also not practical to weld the elements together because of the effect such welds would have on the appearance of the finished furniture item.

Because of the above factors, it is common to provide a bracket which may be connected to one frame element, whereupon a second frame element is telescoped over the bracket. The bracket is designed so as to grip, in some manner, the second frame element to secure the members together.

While many of such brackets are presently available, most have serious limitations associated therewith. In the first instance, most available brackets do not provide a sufficiently rigid and strong connection to make them feasible for use either in store fixtures, scaffolds, racks and the like which must carry heavy loads or in furniture which is to be durable and lasting.

Available brackets for use with square or rectangular tubular frame elements invariably grip and operate upon a central portion of the sides of the frame elements. This has a significant disadvantage in that the force exerted upon the sides of the frame elements, in the centers thereof, has a tendency to distort the frame element, causing it to bulge in the center thereof. As a result, to withstand the force of the bracket, it often becomes necessary to increase the thickness of the walls of the structure, but this entails additional expense. Moreover, brackets that grip the center of the sides of the frame elements prevent the use of external shelf brackets that cooperate with slots located at the center of the sides of the frame elements.

Other problems exist with available connector brackets. Some brackets are not sufficiently flexible to permit ready insertion of the bracket into the frame elements so that considerable difficulties are encountered in assembling the structure. Other structures require the frame elements to be telescoped over the bracket with a first angular orientation and then be twisted or rotated through some angle to lock the frame elements together. In the case of large structures with many interconnecting elements, this may not be practical.

SUMMARY OF THE INVENTION

According to the present invention, there is provided a structure for connecting tubular frame elements which overcomes all of the problems mentioned above with prior structures. In the first instance, the present connector structure provides an extremely rigid and exceedingly strong connection between the frame elements so as to make the elements capable of withstanding heavy loads with great durability. The present connector structure is sufficiently flexible to facilitate the assembly of the frame elements and to assure a rigid connection of the frame elements thereafter. According to a preferred embodiment of the present invention, the present connector structure operates upon the corners of the frame element so as to make use of the tension characteristics of the tubular material at a location where it can withstand the gripping force even with thin walls. Accordingly, the present frame connector structure eliminates the problem of distortion of the frame elements. Finally, the present connector structure permits the frame element to be directly telescoped thereover without the necessity for twisting or turning thereof.

Briefly, the present frame connector structure for connecting a tubular frame element having a generally square or rectangular cross-section to another structural element comprises an elongated connector structure adapted to be connected to the structural element and to extend into the frame element. The connector structure includes a plurality of arms which diverge in mutually orthogonal directions to engage the inner surfaces of the frame element, preferably at the four corners thereof. Each of the arms includes or supports a compressible structure which is sufficiently flexible to facilitate the telescoping of the frame element thereover and, thereafter, to rigidly grip the frame element to form an exceedingly strong connection. According to the preferred embodiments of the invention, the compressible structure comprises a plurality of teeth positioned at the radially outer end of each of the arms to increase the gripping action of the connector structure.

It is therefore an object of the present invention to provide a novel structure for connecting frame elements such as used in furniture, store fixtures, scaffolds, racks and the like.

It is a further object of the present invention to provide a frame connector structure which provides a rigid and exceedingly strong connection between the frame elements.

It is a still further object of the present invention to provide a frame connector structure which includes gripping means for engaging the corners of a square or rectangular structure.

It is another object of the present invention to provide a frame connector structure comprising a plurality of arms which include or support a compressible structure which is sufficiently flexible to permit ready assemblage of the frame elements and which rigidly grips the frame elements to form an exceedingly strong connection.

It is still another object of the present invention to provide a frame connector structure including a plurality of flexible teeth for gripping the frame elements.

Another object of the present invention is the provision of a rigid and strong frame connector structure which does not interfere with the normal shape and function of the frame elements, which causes no distortion thereof, and which allows the use of external shelf brackets without interference.

Still other objects, features and attendant advantages of the present invention will become apparent to those skilled in the art from a reading of the following detailed description of the preferred embodiments constructed in accordance therewith, taken in conjunction with the accompanying drawings wherein like numerals designate like parts in the several figures.

BRIEF DESCRIPTION OF THE DRAWINGS

FIG. 1 is a top plan view, partly in section, of first and second tubular frame elements showing a first embodiment of connector structure in operative position relative thereto;

FIG. 2 is a sectional view taken along the line 2—2 in FIG. 1;

FIG. 3 is an exploded, top plan view of the connector structure of FIGS. 1 and 2 showing a preferred technique for constructing the same;

FIG. 4 is a top plan view, partly in section, of first and second tubular frame elements, similar to FIG. 1, but showing the construction of a second embodiment of connector structure where the frame elements are rectangular rather than square;

FIG. 5 is a sectional view taken along the line 5—5 in FIG. 4;

FIG. 6 is a top plan view, partly in section, of first and second tubular frame elements, similar to FIG. 1, showing a third embodiment of connector structure which is a modification of the frame connector structure of FIGS. 1-3;

FIG. 7 is a sectional view taken along the line 7—7 in FIG. 6;

FIG. 8 is an exploded, top plan view of the connector structure of FIGS. 6 and 7 showing a preferred technique for constructing the same;

FIG. 9 is an end elevation view, partly in section, of a fourth embodiment of connector structure shown attached to a tubular frame element;

FIG. 10 is an enlarged view taken along the line 10—10 in FIG. 9;

FIG. 11 is an end elevation view, partly in section, of the connector structure of FIG. 9 showing an additional tubular frame element telescoped thereover;

FIG. 12 is an enlarged view taken along the line 12—12 in FIG. 11;

FIG. 13 is a top plan view, partly in section, of first and second tubular frame elements showing a fifth embodiment of connector structure in operative position relative thereto; and FIG. 14 is a sectional view taken along the line 14—14 in FIG. 13.

DESCRIPTION OF THE PREFERRED EMBODIMENTS

Referring now to the drawings and, more particularly, to FIGS. 1-3 thereof, a first embodiment of connector structure, generally designated 10, may be used to provide a rigid and strong connection between first and second square, tubular frame elements 11 and 12. Generally speaking, connector structure 10 comprises an elongated gripping member, one end 13 of which is adapted to be connected to one side of frame element 11, such as by welding. Frame element 12 is adapted to be telescoped over connector structure 10 whereby connector 10 grips frame element 12 to form a rigid and exceedingly strong connection.

According to the embodiment of FIGS. 1-3, connector structure 10 includes a plurality of arms 14-17 which diverge in mutually orthogonal directions from the longitudinal axis 18 of structure 10. Such a structure may be most conveniently formed, as shown in FIG. 3, by positioning central slots 20 and 21 in opposite ends of first and second planar members 22 and 23, respectively, and by interlocking members 22 and 23 by extending member 23 into slot 20 in member 22 and extending member 22 into slot 21 in member 23, as shown in FIG. 1.

According to the preferred embodiment of the present invention, and as exemplified in the embodiment of FIGS. 1-3, connector structure 10 is oriented relative to frame element 12 so that arms 14-17 engage the four corners of frame element 12. By making the width of each of members 22 and 23 slightly in excess of the nominal inside diagonal dimension of frame element 10, and by incorporating a compressible structure in arms 14-17, as will be explained more fully hereinafter, an extremely strong and rigid connection between elements 11 and 12 is formed, without the disadvantages of prior structures which engage the sides of frame element 12. By having arms 14-17 contact the corners of frame element 12, connector structure 10 utilizes the tension characteristics of the tubing of which element 12 is formed but applies the force to frame element 12 at a location where it can most readily accept such force, even if the walls of frame element 12 are relatively thin. Therefore, there is no possibility of distorting the sides of frame element 12.

Another, admittedly less significant, advantage results from positioning arms 14-17 in the manner shown in the embodiment of FIGS. 1-3. More specifically, frame elements 11 and 12 are usually formed by bending a planar sheet of metal into a square shape. Accordingly, one side of each of elements 11 and 12 will have a seam which is usually welded, a typical seam being shown at 25 in FIG. 2. It can be seen by inspection of FIG. 2 that if either arms 14 and 16 or arms 15 and 17 were aligned with seam 25, the welding of member 22 or 23 to element 11 would interfere with the welding of seam 25. This is clearly not the case with the present configuration since each of arms 14-17 is positioned at a 45° angle relative to seam 25.

According to the preferred embodiment of the present invention, and as also exemplified by the embodiment of FIGS. 1-3, each of arms 14-17 includes a compressible structure which renders arms 14-17 sufficiently flexible to facilitate the telescoping of frame element 12 thereover and, thereafter, to rigidly grip frame element 12 to form an exceedingly strong connection. In the embodiment of FIGS. 1–3, such flexibility is achieved by cutting a plurality of slots 26 into the radially outer ends of each of arms 14–17 so as to provide a plurality of teeth 27. As shown in FIGS. 1–3, slots 26 are configured with parallel sides so that each tooth 27 also has parallel sides. In addition, such parallel sides of slots 26 and teeth 27 are positioned at an acute angle relative to the longitudinal axis 18 of connector structure 10, with the apices of teeth 27 pointing toward the base end 13 of connector structure 10.

The advantages of such a configuration should be readily apparent. By making the sides of teeth 27 parallel and by angling teeth 27 at an acute angle relative to the longitudinal axis 18 of connector structure 10, teeth 27 are made relatively flexible and can bend somewhat towards axis 18 of connector 10. Accordingly, each of arms 14–17 has a high degree of flexibility. When frame element 12 is telescoped over connector structure 10, the tangential force exerted by the walls of element 12 is in the direction of the flexibility of teeth 27 so that frame element 12 is readily and easily telescoped over connector structure 10. On the other hand, once frame element 12 is positioned as shown in FIGS. 1 and 2, any attempt to remove element 12 in a direction away from element 11 causes the leading edges 28 of teeth 27 to dig into the material of frame element 12 to prevent such removal. Accordingly, once assembled, connector structure 10 provides a rigid and exceedingly strong connection between frame elements 11 and 12.

Referring now to FIGS. 4 and 5, there is shown a second embodiment of connector structure, generally designated 40, which may be used to provide a connection between first and second tubular frame elements 41 and 42. Connector structure 40 is in all material respects identical to connector structure 10, but is modified for use where frame element 12 is rectangular rather than square. In such a case, it is not possible to form arms 14–17 in the manner shown in FIG. 3. Instead, connector structure 40 comprises first and second planar members 43 and 44, each of which includes a central portion and outer portions which are bent at 45° angles to form arms 45 and 46 and arms 47 and 48, respectively. The central portions of members 43 and 44 are spot welded together, as at 50–53. Other than these differences in construction, connector structure 40 is identical to connector structure 10 and includes a plurality of teeth 55 for gripping frame element 42 to form a rigid and strong connection therebetween.

Referring now to FIGS. 6–8, there is shown a third embodiment of connector structure, generally designated 60, which is, in essence, a modification of the embodiment of FIGS. 1–3. Accordingly, FIGS. 6–8 correspond exactly to FIGS. 1–3, respectively, and like parts have been given like numerals. Connector structure 60 is in all material respects identical to connector structure 10, with the exception that each and every one of teeth 27 is rotated through an angle of 90°. The advantage of this configuration over that of FIGS. 1–3 is two-fold. In the first instance, the rotation of teeth 27 makes them more flexible so that it is easier to telescope frame element 12 over connector structure 60. In addition, a more rigid connection is formed by increasing the area of contact between teeth 27 and the walls of frame element 12.

More specifically, in connector structure 10, and as shown in FIGS. 2 and 3, only the leading edges 28 of teeth 27 dig into the material of frame element 12. On the other hand, in the case of connector structure 60, and as shown in FIG. 7, the opposite edges 61 and 62 of teeth 27 dig into opposite sides of frame element 12, making a more rigid and stronger connection.

Referring now to FIGS. 9–12, there is shown a fourth embodiment of the present invention in which a different structure is utilized to render the arms of the gripping member compressible and flexible. More specifically, the embodiment of FIGS. 9–12 includes a connector structure, generally designated 70, for interconnecting first and second tubular frame elements 71 and 72. Connector structure 70 is an elongated member, the base 73 of which is connected, by welding, to one side of frame element 71. Connector structure 70 includes a plurality of arms 74–77 which diverge in mutually orthogonal directions from the longitudinal axis 78 of structure 70. As in the previous embodiments, the radially outer ends of arms 74–77 are adapted to engage and grip the corners of frame element 72. Furthermore, arms 74–78 may be formed of two planar members, similar to the structure shown in FIG. 3.

Since each of arms 74–77 is identical, a complete explanation of the structure of one will serve to fully explain the structure of all. With reference primarily to FIGS. 9 and 10, the radially outer end of arm 74 is slit along spaced lines, such as 80, perpendicular to axis 78. Such spaced slits 80 form a plurality of tabs 81. Alternate tabs 81 are bent outwardly on one side of arm 74, the remaining tabs being bent outwardly on the other side of arm 74. Such bending is done to space alternate tabs 81 by a distance approximately equal to the width of arm 74, but so that the sides of tabs 81, on either side of arm 74, remain parallel, as shown in FIG. 9. Such bending of tabs 81 forms an elongated slot 82 in the outer end of arm 74.

Positioned within each slot 82 in the outer ends of arms 74–77 is an elongated saw strip 84–87, respectively. Again, since each of saw strips 84–87 is identical, a complete explanation of the structure of one will suffice to fully explain the structure of all. More specifically, strip 84 is an elongated planar member, the outer and inner surfaces 90 and 91 of which are arcuate. In addition, the outer end 90 of strip 84 has a saw-like configuration. Saw strip 84 is positioned within slot 82 in arm 74. Because inner surface 91 of saw strip 84 is arcuate, surface 91 is spaced from the base of slot 82, except at the opposite ends thereof, at 93 and 94. Finally, the degree of curvature of strips 84–87 is such that the distances between saw-like surfaces 90 of opposed strips 84 and 86 and strips 84 and 87 exceed the nominal inside diagonal dimension of frame element 72. On the other hand, the width of arms 74, 76 and 75, 77 is less than the nominal inside diagonal dimension of frame element 72.

In operation, because of the relatively thin construction of strips 84–87, they are flexible and compress readily in the presence of a radially inward force. Accordingly, when frame element 72 is telescoped over connector structure 70, strips 84–87 bend inwardly, as shown in FIGS. 11 and 12, so that the inner surfaces 91 thereof move closer to the bases of slots 82. However, such bending of saw strips 84–87 places them under tension so that teeth 90 push outwardly and dig into the inner surfaces of frame element 72, making a rigid and exceedingly strong connection between elements 71 and 72.

Referring now to FIGS. 13 and 14, there is shown a fifth embodiment of connector structure, generally designated 100, for use in connecting first and second tubular frame elements 101 and 102. Connector structure 100 is formed in a manner similar to connector structure 10 from first and second interlocking planar members 103 and 104 to form divergent arms 105–108 which are operative to engage the corners of frame element 102. In the case of connector structure 100, arms 105–108 are made flexible and compressible by the provision of an elongated rib 115–118 running the entire length of arms 105–108, respectively. Such ribs make each of arms 105–108 radially compressible to permit ready telescoping of frame element 102 over connector structure 100. On the other hand, the compression of arms 105–108 results in a corresponding force on the corners of frame element 102 to form a rigid and exceedingly strong connection between elements 101 and 102 via connector 100.

It can therefore be seen that in accordance with the present invention, there is provided a plurality of structures which are ideally suited for connecting tubular frame elements, such as used in furniture, cabinets, store fixtures, scaffolds, racks and the like, and which overcome all of the problems present in prior art structures. In the first instance, connector structures 10, 40, 60, 70 and 100 provide extremely rigid and exceedingly strong connections between the respective frame elements so as to make the elements capable of withstanding heavy loads. In addition, each of connector structures 10, 40, 60, 70 and 100 permits the ready assembly of the frame elements at the site of use, if desired. According to the preferred embodiment of the present invention, the present connector structures operate upon the corners of the frame elements so as to make use of the tension characteristics of such elements, where they can withstand the gripping force even with thin walls, thereby eliminating the problem of distortion of the frame elements. Finally, the present connector structures permit the frame element to be directly telescoped thereover without the necessity for twisting or turning of either the frame element or the connector structure.

While the invention has been described with respect to the preferred physical embodiments constructed in accordance therewith, it will be apparent to those skilled in the art that various modifications and improvements may be made without departing from the scope and spirit of the invention. Accordingly, it is to be understood that the invention is not to be limited by the specific illustrative embodiments, but only by the scope of the appended claims.

We claim:

1. Apparatus connecting a tubular frame element having a generally rectangular cross-section to another structural element comprising:

gripping means, made of a material harder than said tubular element, adapted to be connected to said structural element and extending into said tubular frame element engaging at least two of the corners of said frame element, said gripping means including:

compressible means rigidly locking said frame element including a plurality of generally planar, interconnected arms which diverge in mutually orthogonal directions to engage all four corners of said tubular frame element; each of the arms having a plurality of relatively elongated, resilient teeth formed therein at the radially outer end of each arm for biting into the material of said frame element to prevent removal of said connector structure therefrom, opposite sides of said teeth being parallel and positioned at an acute angle relative to the longitudinal axis of said connector structure, the apices of said teeth pointing toward said structural element.

2. The apparatus according to claim 1 wherein the outer end of each of said teeth is rotated through an angle of approximately 90° so as to be perpendicular to its respective arm, thereby increasing the flexibility of the arm.

3. For use with a tubular frame element having a generally rectangular cross-section, the combination therewith of:

elongated gripping means made of a material harder than said frame element and having one end adapted to be affixed to a support with its opposite end free for insertion into said tubular frame element, said gripping means including spaced, generally planar, interconnected arms extending from a common support, said gripping means defining four corners corresponding to the inside corners of said tubular frame element for engagement therewith;

at least one side of said gripping means forming with the corresponding side of said frame element, a hollow space;

the distal end of each arm having a series of longitudinally spaced relatively elongated, resilient teeth formed therein and positioned at an acute angle relative to the length of said gripping means, the teeth being normally slanted in a direction outwardly of the tubular frame element and the teeth being flexibly bent rearwardly upon engagement with the corresponding inside corners of said frame element and the teeth being resilient to maintain contact with said corners, the teeth biting into the frame element for forming a rigid connection between the frame element and said gripping means.

4. Apparatus according to claim 3 wherein said gripping means further comprises:

first and second planar members, each of said planar members having a central portion and first and second outer portions on either side of said central portion, said outer portions being positioned at an angle of 45° relative to said central portion, on the same side thereof, the central portions of said first and second members being connected together whereby said outer portions extend in mutually orthogonal directions to engage the corners of said frame element.

5. Apparatus according to claim 4 wherein said compressible means comprises:

a plurality of teeth positioned at the radially outer end of each of said arms for biting into the material of said frame element to prevent removal of said connector structure therefrom.

6. Apparatus according to claim 5 wherein opposite sides of said teeth are parallel and positioned at an acute angle relative to the longitudinal axis of said connector structure, the apices of said teeth pointing toward said structural element.

7. Apparatus according to claim 6 wherein the outer end of each of said teeth is rotated through an angle of approximately 90° so as to be perpendicular to its respective arm.

8. The combination as set forth in claim 3 in which said hollow space is sufficient in size to receive hooks of shelf supports projecting through slots in the said corresponding frame element side.

9. The combination as set forth in claim 3 in which said arms project in mutually orthogonal directions.

10. The combination as set forth in claim 3 in which the arms of said gripping means are dimensioned to engage only the inside corners of said frame element.

11. The combination as set forth in claim 10 in which said arms project substantially in mutual orthogonal directions.

12. The combination as set forth in claim 3 in which said teeth have substantially parallel side edges.

13. The combination as set forth in claim 3 in which said tubular frame element is square.

14. The combination as set forth in claim 3 in which the teeth are individually rotated, the end edges of said teeth extending at an angle of substantially 45° to each of the frame element sides forming the corresponding corner.

* * * * *